(12) United States Patent
Kaehler et al.

(10) Patent No.: US 9,946,584 B2
(45) Date of Patent: Apr. 17, 2018

(54) SYSTEMS AND METHODS FOR EXTRACTING APPLICATION RELEVANT DATA FROM MESSAGES

(75) Inventors: Adrian Kaehler, North Hollywood, CA (US); Shi-Ping Hsu, Pasadena, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 2899 days.

(21) Appl. No.: 12/241,775

(22) Filed: Sep. 30, 2008

(65) Prior Publication Data

US 2009/0234844 A1 Sep. 17, 2009

Related U.S. Application Data

(60) Provisional application No. 61/036,743, filed on Mar. 14, 2008.

(51) Int. Cl.
*G06F 7/00* (2006.01)
*G06F 17/30* (2006.01)
*G06F 9/54* (2006.01)

(52) U.S. Cl.
CPC ........ *G06F 9/546* (2013.01); *G06F 2209/542* (2013.01)

(58) Field of Classification Search
CPC ................................................ G06F 17/2264
See application file for complete search history.

(56) References Cited

U.S. PATENT DOCUMENTS 5,560,005 A * 9/1996 Hoover et al.
5,778,385 A * 7/1998 Pratt
6,199,068 B1 * 3/2001 Carpenter
6,904,360 B2 * 6/2005 Pechatnikov et al. ........ 701/532
7,076,541 B1 7/2006 Burstein et al.
(Continued)

FOREIGN PATENT DOCUMENTS

GB 2 354 850 A 4/2001
WO WO 2006/042314 A2 4/2006
(Continued)

OTHER PUBLICATIONS

Xiaohua Jia; A distributed Algorithm of Delay-Bounded Mulitcast Routing for Multimedia Applications in Wide Area Networks;ACM;1998;pp. 828-837.*

(Continued)

*Primary Examiner* — Mariela Reyes
*Assistant Examiner* — Jermaine Mincey
(74) *Attorney, Agent, or Firm* — Tarolli, Sundheim, Covell & Tummino LLP (57) ABSTRACT

Systems and methods are provided for extracting application relevant data from messages. In one embodiment, a system can comprise a message parser that parses messages and builds a message tree having one or more objects, one or more data type templates that define a given data type based on one or more data elements and a comparison engine that matches data elements in the one or more objects with data elements in the one or more data type templates. The comparison engine groups data elements in the one or more objects that matches data elements in the one or more data templates as a specific data type corresponding to the associated data type template that is matched.

20 Claims, 9 Drawing Sheets

(56) References Cited

U.S. PATENT DOCUMENTS

| | | | |
|---|---|---|---|
| 7,325,042 B1* | 1/2008 | Soscia | G06F 17/30575 707/E17.032 |
| 7,391,735 B2* | 6/2008 | Johnson | G06F 9/546 370/246 |
| 2003/0208493 A1* | 11/2003 | Hall et al. | 707/100 |
| 2005/0108206 A1* | 5/2005 | Lam et al. | 707/3 |
| 2005/0216917 A1* | 9/2005 | Krishnaswamy et al. | 719/315 |
| 2006/0143220 A1* | 6/2006 | Spencer, Jr. | 707/102 |
| 2006/0161590 A1* | 7/2006 | Cahill et al. | 707/200 |
| 2007/0016897 A1 | 1/2007 | Todd | |
| 2007/0130176 A1* | 6/2007 | Kawabe et al. | 707/100 |
| 2007/0299854 A1* | 12/2007 | Bohlmann et al. | 707/100 |
| 2008/0016059 A1* | 1/2008 | Henkin et al. | 707/5 |
| 2008/0021861 A1* | 1/2008 | Fitzsimons et al. | 707/1 |
| 2008/0033968 A1* | 2/2008 | Quan et al. | 707/100 |
| 2008/0071735 A1 | 3/2008 | Harrison et al. | |
| 2008/0082614 A1 | 4/2008 | Bedi et al. | |

FOREIGN PATENT DOCUMENTS

| | | | |
|---|---|---|---|
| WO | WO 2006/042314 A3 | 4/2006 | |
| WO | WO 2006042314 A2 * | 4/2006 | 707/809 |

OTHER PUBLICATIONS

Search Report for corresponding GB0904268.0, completed Jun. 30, 2009.

Kaehler, et al. patent application for "Systems and Methods for Linking Software Applications"; filed on Sep. 30, 2008.

Great Britain Search Report for corresponding GB 0904268.0 completed Jun. 30, 2009.

* cited by examiner

SYSTEMS AND METHODS FOR EXTRACTING APPLICATION RELEVANT DATA FROM MESSAGES

RELATED APPLICATIONS

The present invention claims priority from U.S. Provisional Patent Application No. 61/036,743, filed Mar. 14, 2008 and is incorporated herein by reference.

TECHNICAL FIELD

The present invention relates generally to computer software, and more particularly to systems and methods for extracting application relevant data from messages.

BACKGROUND

On a typical modern computer desktop, there are a wide variety of different software applications which are required for a user to complete his or her workflow. These applications may be common desktop applications, or custom applications which are often front-ends to services which reside elsewhere, such as database or analytical tools. Most software application programs are designed to have a front end portion and a back end portion. The front end portion provides a mechanism for a user to interact with functions of the software application, for example, through a graphical user interface (GUI) or an application program interface (API). The back end portion is typically the execution engine for performing the functions and providing responses of the function to the front end portion in response to events that occur in the front end portion. The front end portion and the back end portion communicate with one another through messages that inform the back end portion of events occurring in the front end portion, and instruct the front end portion to respond to messages provide by the back end portion. Software applications generally cannot communicate with one another since the front end portion and back end portion of a given application is designed to communicate with one another and not other front end portions and back end portions. Therefore, since front end and back end portions of software applications are designed to understand specific messages and data types, they are not designed to understand messages and data types between front end and back end portions of other software applications.

SUMMARY

In one aspect of the invention, a system is provided for extracting application relevant data from messages. The system can comprise a message parser that parses messages and builds a message tree having one or more objects, one or more data type templates that define a given data type based on one or more data elements and a comparison engine that matches data elements in the one or more objects with data elements in the one or more data type templates. The comparison engine groups data elements in the one or more objects that matches data elements in the one or more data templates as a specific data type corresponding to the associated data type template that is matched.

In another aspect of the invention, a computer readable medium is provided having computer executable components for linking software applications and extracting application relevant data from messages between software applications. The computer readable medium can comprise a first application relevant data extractor associated with a first software application, and a second application relevant data extractor associated with a second software application. The first application relevant data extractor can comprise a first plurality of data type templates that each define a given data type based on one or more data elements relevant to the first software application and a first comparison engine that matches data elements in messages provided to the first software application with data elements in one or more of the first plurality of data type templates. The first comparison engine groups data elements from the messages that match data elements in the one or more of the first plurality of data templates as specific data types corresponding to the associated data type templates that are matched and maps the specific data types that are matched to the associated data type template to objects in the first software application. The second application relevant data extractor comprises a second plurality of data type templates that each define a given data type based on one or more data elements relevant to the second software application and a second comparison engine that matches data elements in messages provided to the second software application with data elements in one or more of the second plurality of data type templates. The second comparison engine groups data elements from the messages that match data elements in the one or more of the second plurality of data templates as specific data types corresponding to the associated data type templates that are matched and maps the specific data types that are matched to the associated data type template to objects in the second software application.

In yet a further aspect of the invention, a method for extracting application relevant data from messages is provided. The method can comprise parsing a message received from a first software application and building a message tree of the parsed message having one or more objects and comparing data elements in the one or more objects with data elements in one or more data type templates to determine matches between data elements in the one or more objects to data elements in the one or more data templates. The data type templates define a given data type based on one or more data elements. The method further comprises mapping the data elements in the one or more objects that match data elements in the one or more data templates into a second software application.

DETAILED DESCRIPTION

Most network based protocols for communicating data use a rigidly defined method of exchanging data. The present systems and methods allow for a much more flexible means of extracting and exchanging data. In particular, applications do not rigidly define what messages are expected, rather, templates define data types based on data elements which are matched to data elements within an incoming message, and the character of a template determines how important data elements of an incoming message will be understood by a given application program. The present systems and methods can be employed in the extracting and exchanging of messages between application programs without employing a predetermined schema.

Figure 1:
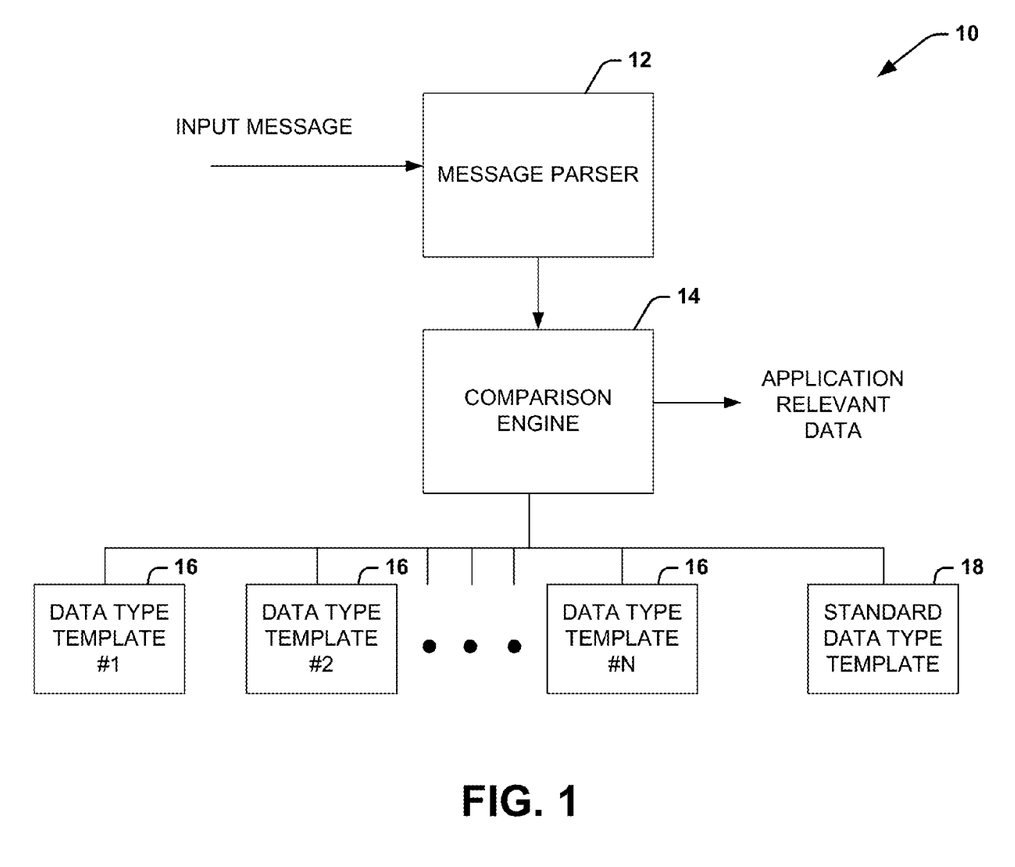
FIG. 1 illustrates a block diagram of a system for extracting application relevant data from messages in accordance with an aspect of the present invention.

FIG. 1 illustrates a block diagram of a system 10 for extracting application relevant data from messages in accordance with an aspect of the present invention. The messages can be, for example, of an abstract form, represented as key-value pairs, labeled trees, or an analogous data structure (e.g. XML). The system 10 includes a message parser 12 that parses the messages and builds a message tree having a plurality of objects that form the message. An object can have a hierarchy of one more child objects with one or more terminating attributes (e.g., string of characters) and/or terminating values (e.g., number values). The object can have one or more data elements that have application relevant data that can be employed by an application program. The system employs one or more data type templates that define a data type based on a set of data elements. For example, a data template can define a person data type based on an object that has data element identifiers last name, first name and age and associated data element attributes and/or values. A data template can define a vehicle data type based on an object that has data element identifiers wheels, engine and seats and associated data element attributes and/or values. A user/programmer can build a variety of different data templates that define a variety of different data types based on what data types are relevant to a given application.

The example of FIG. 1 illustrates customized data type templates 16 labeled from 1 to N, where N is an integer greater than or equal to one. Additionally, a standard data type template file 18 is provided. The standard data type template file 18 is a file that can be employed to provide a universal data type ontology between software applications such that data types have a common definition between software applications. The standard data type template file 18 can contain definitions of a wide variety of data types. For example, the following is an example of an object that includes a geospatial location definition residing in the standard data type template file 18:

```
<map tid='geospatialLocation'>
    <scalar label='Long(itude)?' called='Longitude'/>
    <scalar label='Lat(itude)?' called='Latitude'/>
    <scalar label='Altitude'    called='Altitude' cardinality='*'/>
    <scalar label='Name'        called='Name'    cardinality='*'/>
</map>
```

The notation above indicates there should be an element called "Long" which might also be spelled "Longitude", but in any case will be associated (called) with the keyword "Latitude" or "Lat", once it is found. It also tells us that the attributes Altitude and Name may be present, but may also be absent (cardinality). If data element identifiers of these types are detected in an object, then the data elements are grouped together and identified as a data type geospatial location.

The system 10 includes a comparison engine 14 that compares the data elements in the objects of the parsed messages with the one or more data type templates 16 and the standard data type template file 18. If the data elements in objects match data elements in the one or more data type templates 16 or the data types in the standard data type template file 18, the data elements are determined to be a specific data type and the data elements and associated attributes and/or values are grouped together and extracted as application relevant data and mapped into an object of an associated software application.

It is to be appreciated that many data templates can employ objects of a given data type derived from objects of another data type. For example, Application-A may have the notion of a Sighting (e.g., like seeing Big Foot), and that may be derived from geospatialLocation in that it has the same template as a geospatialLocation but which also specifies a time at which the sighting occurred and what was actually sighted. Those things may be specified as required elements or optional. This means that if some other Application-B defines some internal object type as being equivalent to the STF object geospatialLocation, then if a sighting is overheard, the sighting will match the geospatialLocation template and be accepted. The relevant information will be mapped into the internal object inside of Application-B and the remaining information will be ignored. In general then, when any message representing a type derived from some ancestor X is received by an application which has a template which is itself derived from X, then the listener will understand at least the portion of the message corresponding to X. As a result, the standard data type template file 18 file serves as a minimal basis for communication.

In one aspect of the invention, the systems and methods are employed in linking software applications by allowing for sharing and extraction of application relevant data between software applications. One example of such systems and methods is provide in commonly owned application "entitled "Systems and Methods for Linking Software Applications" Ser. No. 12/241,835, filed on the same day as the present application, the entire contents of which is incorporated herein.

Figure 2:
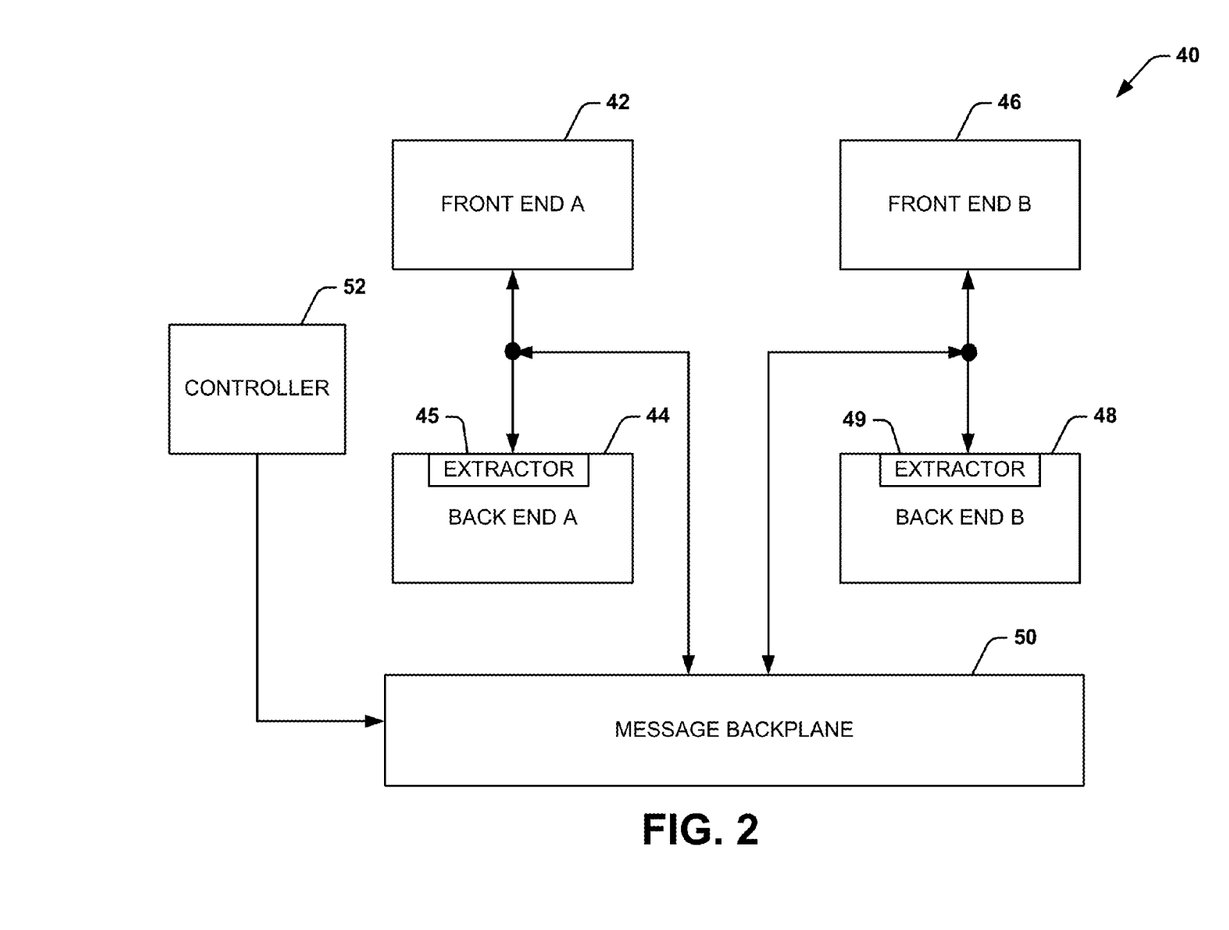
FIG. 2 illustrates a block diagram of a system for linking software applications and extracting application relevant data from messages in accordance with an aspect of the present invention.

FIG. 2 illustrates a block diagram of system 40 for linking software applications and extracting application relevant data from messages in accordance with an aspect of the present invention. The system 40 employs a message backplane 50 that is coupled to a controller application 52. The message backplane 50 is responsible for maintaining the connections between software applications, and any processing which might be required on the individual messages. A new message bus aware application, such as application A and application B, register with the message backplane 50 during startup to indicate that the application is available for connecting with other applications. Application A includes a front end 42 and a back end 44 and Application B includes a front end 46 and a back end 48. The message backplane 50 can for example monitor for TCP/IP connections from the applications which have, or wish to, register with the message backplane 50. In this manner, the message backplane 50 can be located locally or remotely, and similarly the message bus aware applications can be running on a single machine, or be distributed and thus may be connected between multiple machines.

The message backplane 50 can be directed to connect or disconnect applications by instructions arriving over a TCP/IP connection locally or remotely. Therefore, the controller application 52 can communicate with the message backplane 50 to convey user requested connections. Once the applications are linked, the messages between front end 42 and back end 44 of application A are provided to the message backplane 50 which routes these messages to back end 48 of application B. Additionally, messages between front end 46 and back end 48 of application B are provided to the message backplane 50 which routes these messages to back end 44 of application A.

Application A includes a first application relevant data extractor 45 that is configured to extract application relevant data of the data type that application A understands. The first application relevant data extractor 45 can comprise similar components as illustrated in FIG. 1, such as a message parser, a comparison engine, one or more custom data type templates and employ all or a portion of the standard data type template file. The first application relevant data extractor 45 receives messages from the message backplane 50 that originate from application B and extracts application relevant data by comparing data elements residing in objects of the received message with the one or more custom data type templates and/or the standard data type template file. Once the application relevant data is extracted and mapped to a back end of application A, the back end of Application A generates instructions to the front end of application A to cause events to occur based on the attributes and/or values of the data elements of the extracted application relevant data.

Application B includes a second application relevant data extractor 49 that is configured to extract application relevant data of the data type that application B understands. The second application relevant data extractor 49 can comprise similar components as illustrated in FIG. 1, such as a message parser, a comparison engine, one or more custom data type templates and employ all or a portion of the standard data type template file. The second application relevant data extractor 49 receives messages from the message backplane 50 that originate from application A and extracts application relevant data by comparing data elements residing in objects of the received message with the one or more custom data type templates and/or the standard data type template file. Once the application relevant data is extracted and mapped to a back end of application B, the back end of Application B generates instructions to the front end of application B to cause events to occur based on the attributes and/or values of the data elements of the extracted application relevant data. Although the first and second application relevant data extractors 45 and 49 are illustrated as being part of application back ends A and B, respectively, it is to be appreciated that the first and second application relevant data extractors 45 and 49 can be stand-alone components or be integrated as part of the message backplane 50.

The following is exemplary pseudocode for a messaging ontology for registering applications with the message backplane and for receiving messages over the message backplane:

```
Run Method
Connect to backplane on specified host/port
Send hello message with client identifier
Set Icon property based on application window icon
Start thread to receive messages on backplane connected socket
Wait for a message to come over the socket
Match message against registered templates:
    For each child node in incoming message
        If node matches selected template,
            Tag with matched template name
            Send node to host application through OnMessage
Send Method
Send the specified XML/SOP message over the previously connected
socket
OnMessage Event
User-registered callback for incoming messages
RegisterSopTemplate
Defines a template to matched against in the XML-based SOP
Template Language
SelectSopTemplate
```

Figure 3:
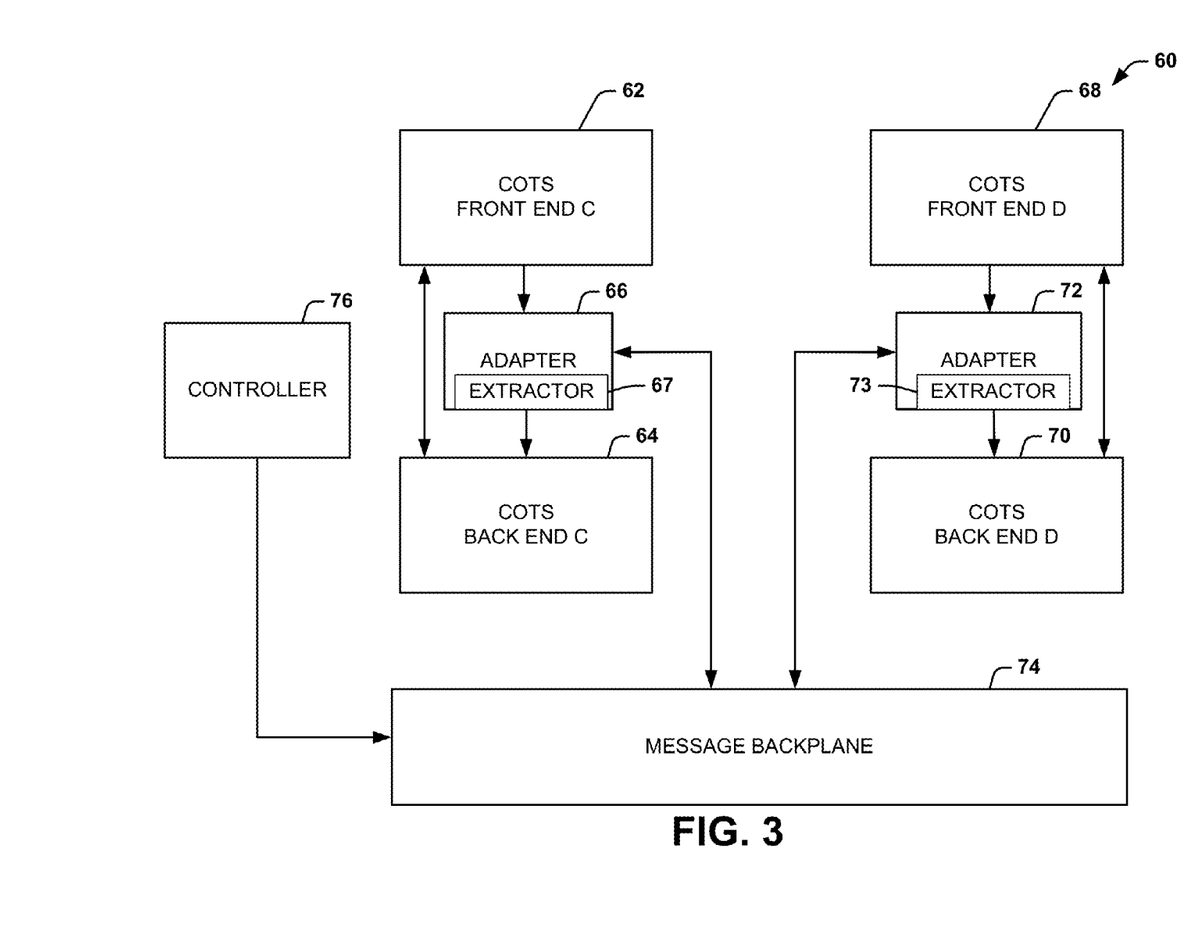
FIG. 3 illustrates a block diagram of a system for linking commercial off the shelf (COTS) software applications and extracting application relevant data from messages in accordance with an aspect of the present invention.

The identifier of a template the application is interested in, either user-defined or from the Standard Template File It is to be appreciated that the system of FIG. 2 works well with message bus aware applications. However, in many situations it is desirable to link and extract messages from two or more commercial off the shelf (COTS) applications. FIG. 3 illustrates a block diagram of system 60 for linking COTS software applications and extracting application relevant data from messages in accordance with an aspect of the present invention. The system 60 employs message backplane adapters that convert messages between COT application formats and the message backplane format. A message backplane adapter is a code module or program which allows an existing COTS application to communicate with the message backplane. Although existing COTS applications have no native awareness of the message backplane, most professional grade applications have some means of communicating and being controlled by an agent other than an interactive GUI. Such interfaces are often TCP/IP based, or in the case of the Microsoft environment, based on COM or .NET. A message backplane adapter is a software device which interacts with an existing application (in whatever manner that application prefers) and presents an interface to the message backplane. The message backplane architecture requires individual applications to broadcast the "internal dialog" which connects application front end (e.g., GUI interface) to their operational back-end and to similarly receive information from outside which can be converted to internal events. For COTS applications, this is handled by a respective message backplane adapter.

FIG. 3 illustrates message backplane adapters provided for interfacing two COTS application programs C and D with a message backplane 74. A first message backplane adapter 66 provides an interface to a front end 62 and a back end 64 of COTS application C and the message backplane 74, and a second message backplane adapter 72 provides an interface to a front end 68 and back end 70 of COTS application D with the message backplane 74. A controller application 76 can communicate with the message backplane 74 to convey user requested connections and connect COTS application programs C and D via the respective message backplane adapters 66 and 72. Once applications are linked, the messages between back end 64 and front end 62 of COTS application C are provided to the message backplane 74 which routes these messages to the second message backplane adapter 72 and the messages between back end 70 and front end 68 of COTS application D are provided to the message backplane 74 which routes these messages to the first message backplane adapter 66.

It is to be appreciated that although the adapter is illustrated as being inserted in between the front and back ends of the COTS application, a COTS application may not be architected with this clear separation, and may not have direct access to the messaging layer. Usually the COTS application exposes some level of connectability for the adapter to provide and consume messages "as if" it were located as illustrated in FIG. 3. However in practice, it is usually simulating this behavior which means essentially it is narrating events it observes inside of the COTS application as the application makes them available through whatever interface the COTS application provides. Similarly, incoming information to the adapter is transformed into commands for the COTS application "as if" there were a direct message sharing into the (hypothetical) internal data bus of the COTS application.

The first message backplane adapter 66 includes a first application relevant data extractor 67 that is configured to extract application relevant data of the data type that COTS application C understands. The first application relevant data extractor 67 can comprise similar components as illustrated in FIG. 1, such as a message parser, a comparison engine, one or more custom data type templates and employ all or a portion of the standard data type template file. The first application relevant data extractor 67 receives messages from the message backplane 74 that originate from application D and extracts application relevant data by comparing data elements residing in objects of the received message with the one or more custom data type templates and/or the standard data type template file. Once the application relevant data is extracted, it can be grouped and converted to COTS application C message format and mapped to the back end 64 of application C. The back end 64 of Application C generates instructions to the front end 62 of application C to cause events to occur based on the attributes and/or values of the data elements of the extracted application relevant data.

The second message backplane adapter 72 includes a second application relevant data extractor 73 that is configured to extract application relevant data of the data type that COTS application D understands. The second application relevant data extractor 73 can comprise similar components as illustrated in FIG. 1, such as a message parser, a comparison engine, one or more custom data type templates and employ all or a portion of the standard data type template file. The second application relevant data extractor 73 receives messages from the message backplane 74 that originate from COTS application C and extracts application relevant data by comparing data elements residing in objects of the received message with the one or more custom data type templates and/or the standard data type template file. Once the application relevant data is extracted, it can be grouped and converted to COTS application D message format and mapped to the back end 70 of application D. The back end 70 of Application D generates instructions to the front end 68 of application D to cause events to occur based on the attributes and/or values of the data elements of the extracted application relevant data.

Though the message backplane framework is designed to make messages understandable to all message backplane aware applications and adapters, it is often the case that a user or developer would like to make two applications communicate which do not natively operate using the same sorts of objects. For example one application may deal with airplanes and geospatial data, while another deals with people and their associated information. The present invention employs message backplane transformers. A message backplane transformer is any element which can be installed into the message backplane and which has the function of transforming information of one data type into information of another data type. A transformer is a tool which can be inserted into a link connecting different message backplane aware applications, or groups of applications, which will convert one data type to another. Message backplane transformers can work in many different ways, but one common means for a transformer to operate is via a database query to some external data store. Transformers are general programs and can be written in any language, though primarily the expectation is that the languages for which a software development kit (SDK) supplies an API that can be used.

Figure 4:
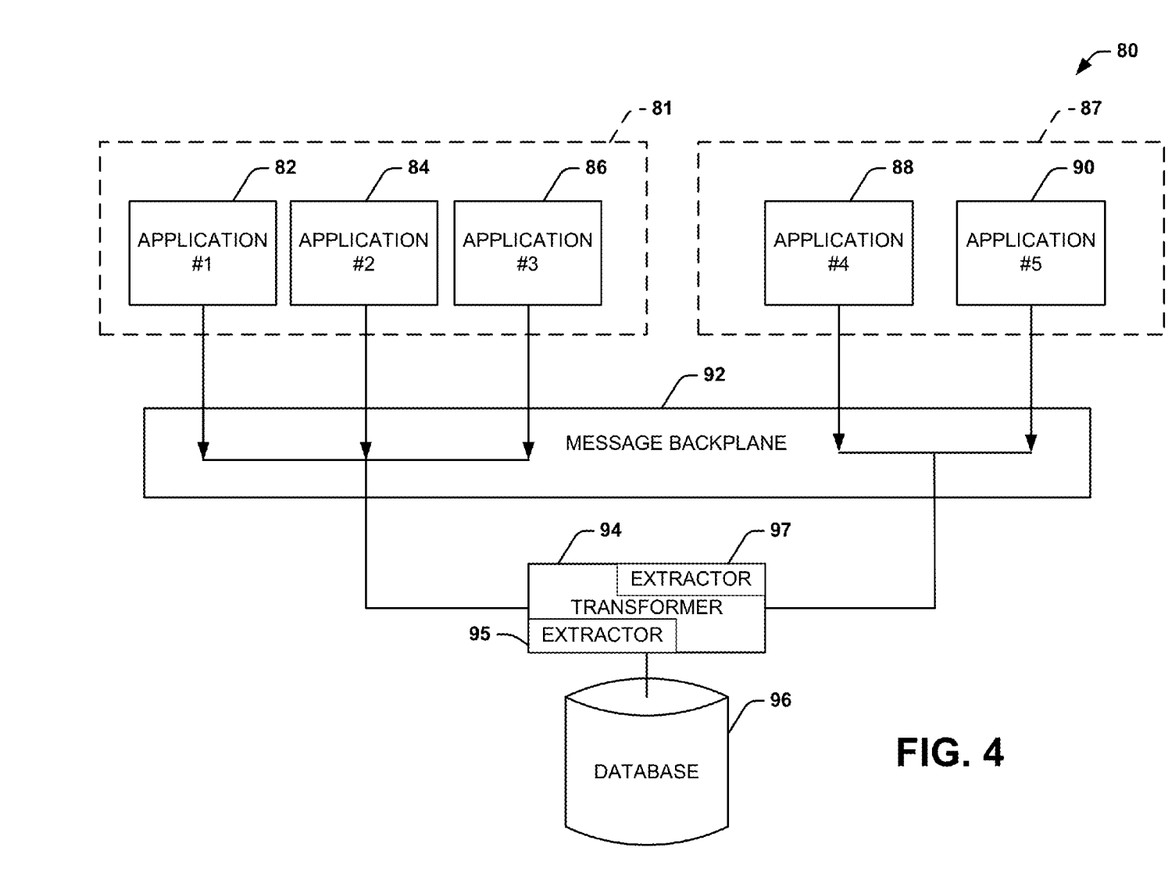
FIG. 4 illustrates a block diagram of a system for linking software applications employing transformers and extracting application relevant data from messages in accordance with an aspect of the present invention.

FIG. 4 illustrates a block diagram of a system 80 for linking software applications employing transformers in accordance with an aspect of the present invention. Application #1 82, application #2 84 and application #3 86 are linked together as a first linked group 81 and application #4 88 and application #5 90 are linked together as a second linked group 87. The data elements that define data types from event messages of members of the first linked group 81 are shared with one another and the data elements that define data types from event messages of members of the second linked group 87 are shared with one another. Application #1 82, application #2 84 and application #3 86 each include an application relevant data extractor (not shown) that includes templates that define data types based on data elements that are in messages shared within members of the first linked group 81. Also, application #4 88 and application #5 90 each include an application relevant data extractor (not shown) that includes templates that define data types based on data elements that are in messages shared within members of the second linked group 87. However, the messages from members of the first linked group 81 do not contain data elements that define data types that are understandable to members of the second linked group 87 and vice versa.

For example, the first linked group 81 can understand an airline flight data type (e.g., include an airline flight data type template) but cannot understand a person data type (e.g., do not include an person data type template), while the second linked group 87 cannot understand an airline flight data type (e.g., do not include an airline flight data type template) but can understand a person data type (e.g., include a person data type template). The first and second linked groups 81 and 87 are linked together through a message backplane transformer 94. The message backplane transformer 94 is coupled to and has access to a database 96, such as a passenger flight list database that links airline flight data types to person data types.

The message backplane transformer 94 receives messages from the first linked group 91 via the message backplane 92 that contains data elements that define data types that are not understandable to members of the second linked group 87. The transformer includes a first application relevant data extractor 95 that extracts the data elements that define data types based on one or more data type templates within the first application relevant data extractor 95 from messages received from the first linked group. The message backplane transformer 94 then retrieves data elements from the database 96 that links or associates data types understandable to members of the first linked group 81 with data types understandable to members of the second linked group 87. Additionally, the message backplane transformer 94 receives messages from the second linked group 87 via the message backplane 92 that contain data elements that define data types that are not understandable to members of the first linked group 81. The transformer 94 includes a second application relevant data extractor 97 that extracts data elements that define data types based on one or more data type templates from messages received from the second linked group 87. The message backplane transformer 94 then retrieves data elements from the database 96 that links or associates data types understandable from the second linked group 87 with data types understandable to members of the first linked group 81.

For example, an event can occur in an application member of the first linked group 81 such as selecting a flight schedule. A message associated with this event can be passed to the message backplane transformer 94 which receives the flight schedule and retrieves a passenger list for the flight schedule from the database 96, which is then provided to members of the second linked group 87. The members of the second linked group 87 can extract the person data type off of the passenger list database and perform the functions associated with the respective members association with the person data type. Also, an event can occur in an application member of the second linked group 87 such as selecting a person. This event can generate a message that is passed to the transformer 94 which receives the person's name and retrieves a passenger list associated with a flight that that person is on from the database 96, which is then provided to members of the first linked group 81. The members of the first linked group 81 can extract a flight schedule that the person is on from the passenger list and perform the function associated with the respective members association with a given flight schedule.

Figure 5:
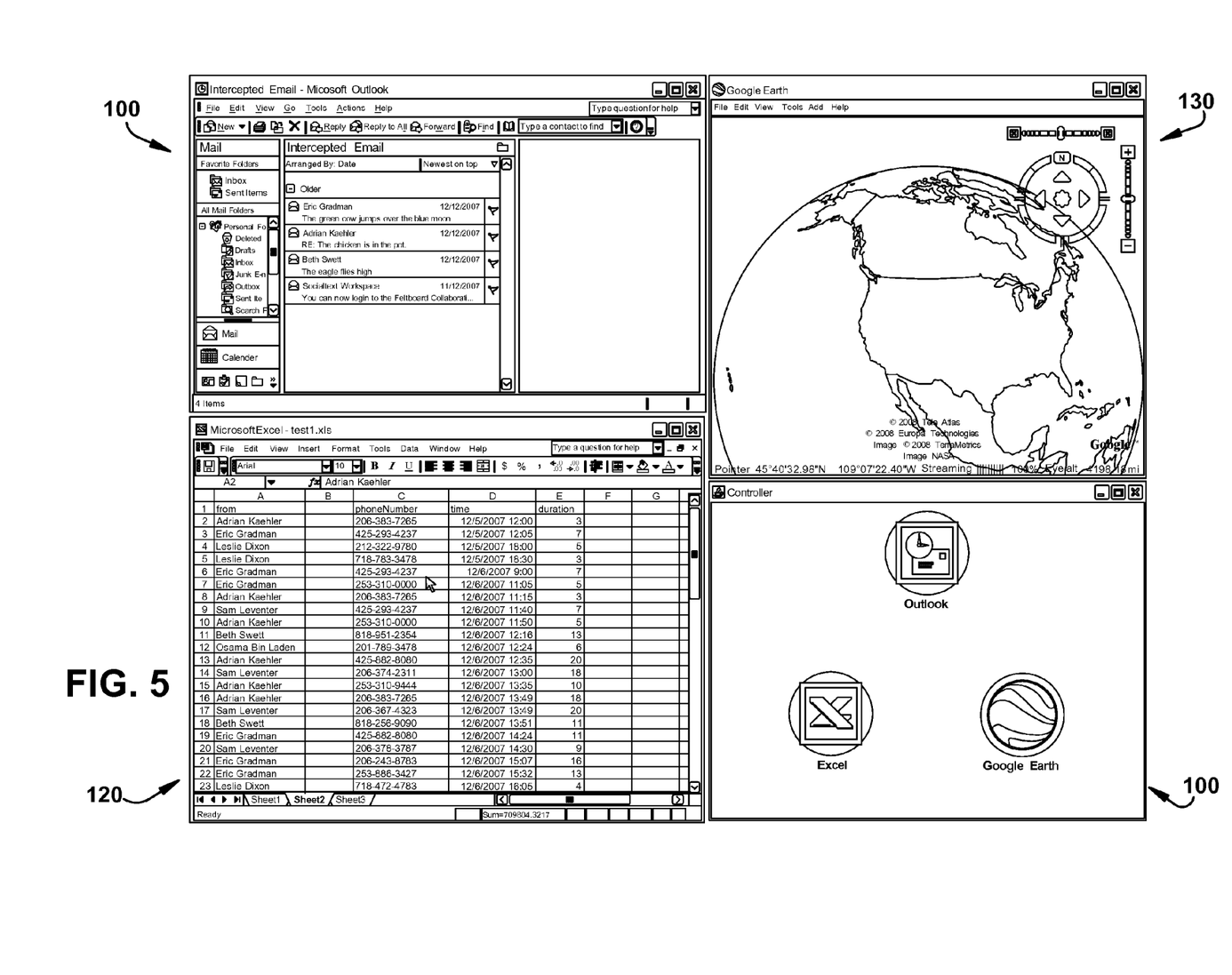
FIG. 5 illustrates a GUI controller and a plurality of GUIs associated with respective COTS applications in accordance with an aspect of the present invention.

FIGS. 5-8 illustrate linking of applications employing a GUI controller 100 and the sharing of information in the messages of the applications between the linked applications in accordance with an aspect of the invention. FIG. 5 illustrates a GUI controller 100 and a plurality of GUIs associated with respective COTS applications. In particular, a first GUI 110 associated with Microsoft® Outlook®, a second GUI 120 associated with Microsoft® Excel® and a third GUI 130 associated with Google® Earth. The GUI controller 100 includes a work space in which adapters of COTS applications have registered with the message backplane causing Icon representations COTS application programs that include Microsoft® Outlook®, Microsoft® Excel® and Google® Earth. The GUI controller 100 is configured to transmit instructions to the message backplane to link and unlink certain applications. The applications can be linked to one another by dragging and dropping one representative icon over another representative icon. This causes the applications to link to one another such that their representative adapters transmit and receive each others messages via the message backplane.

Figure 6:
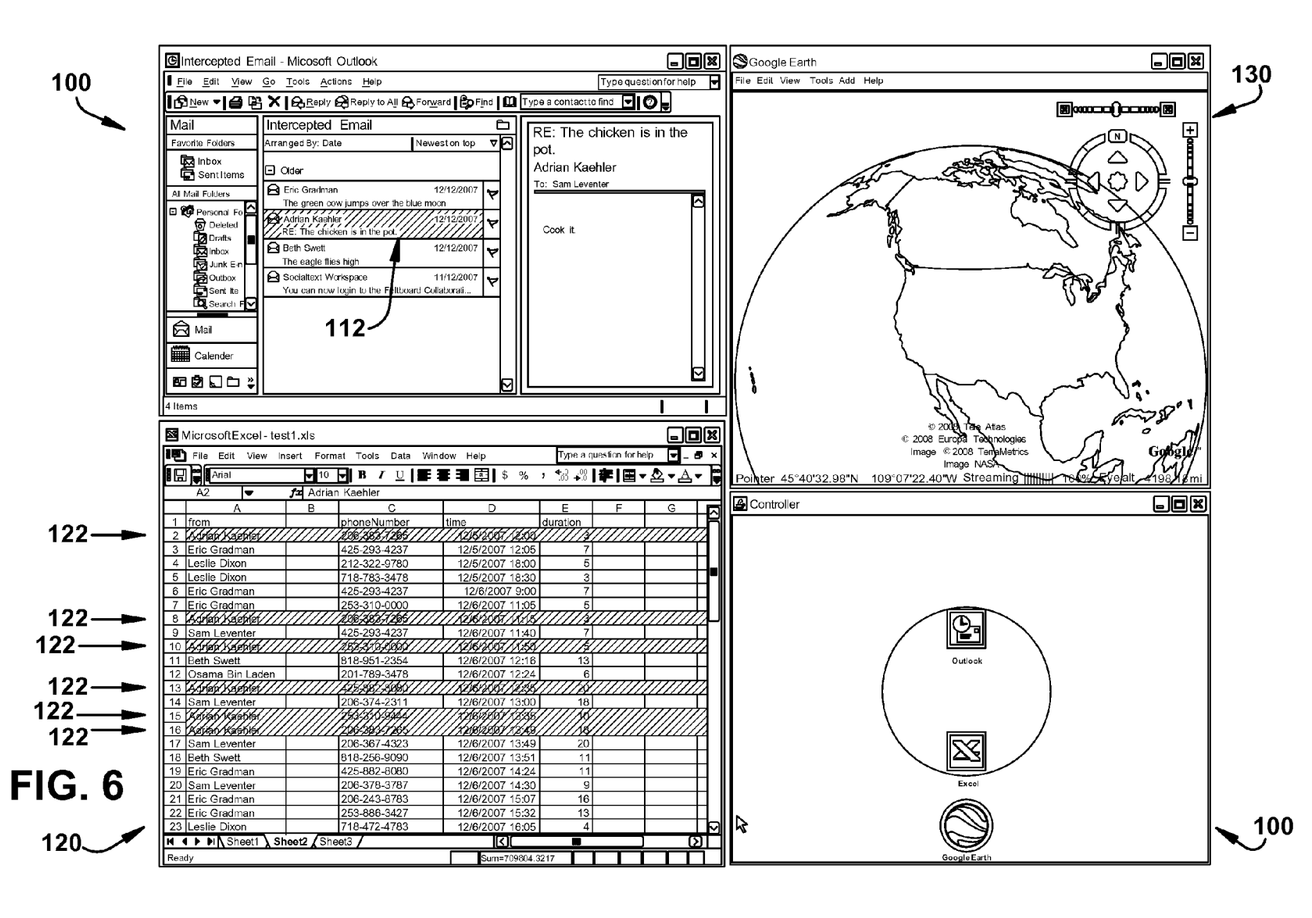
FIG. 6 illustrates a circular linking portion residing in the GUI controller work space in accordance with an aspect of the invention.

FIG. 6 illustrates a circular linking portion residing in the GUI controller work space in accordance with an aspect of the invention. Icons for Microsoft® Outlook® and Microsoft® Excel® reside within the circular linking portion providing a representation that these two programs have been linked as a linked group and share each other's messages, such that events in one application can trigger events in the other application. As further illustrated in FIG. 6, a user has selected a specific e-mail 112 in the first GUI 110 associated with Microsoft® Outlook®, which causes a message with the name "Adrian Kaehler" to be transmitted over the message backplane and received by the application Microsoft® Excel®. The application Microsoft® Excel® includes a file test1.xls that is open and includes a name and associated phone number list with different names and associated phone numbers. The application Microsoft® Excel® provides instructions to the second GUI 120 associated with Microsoft® Excel® to highlight any row 122 with the name "Adrian Kaehler" and its associated phone number as can be seen in FIG. 6. A COTS adapter for Microsoft® Excel® converts the Microsoft® Excel® message format to the message backplane format and vise versa. An application relevant data extractor associated with the COTS adapter looks for matches of data elements in the messages transmitted from message back plane to a person data type template that can look like the following:

```
<map tid='person'>
    <scalar label='Last Name?' called="Last Name '/>
    <scalar label='First Name?' called='First Name'/>
</map>
```

Therefore, the application relevant data extractor will extract data elements in messages that contain data element identifiers "Last Name" and "First Name", such as was received in response to the selection of the above-identified e-mail.

Figure 7:
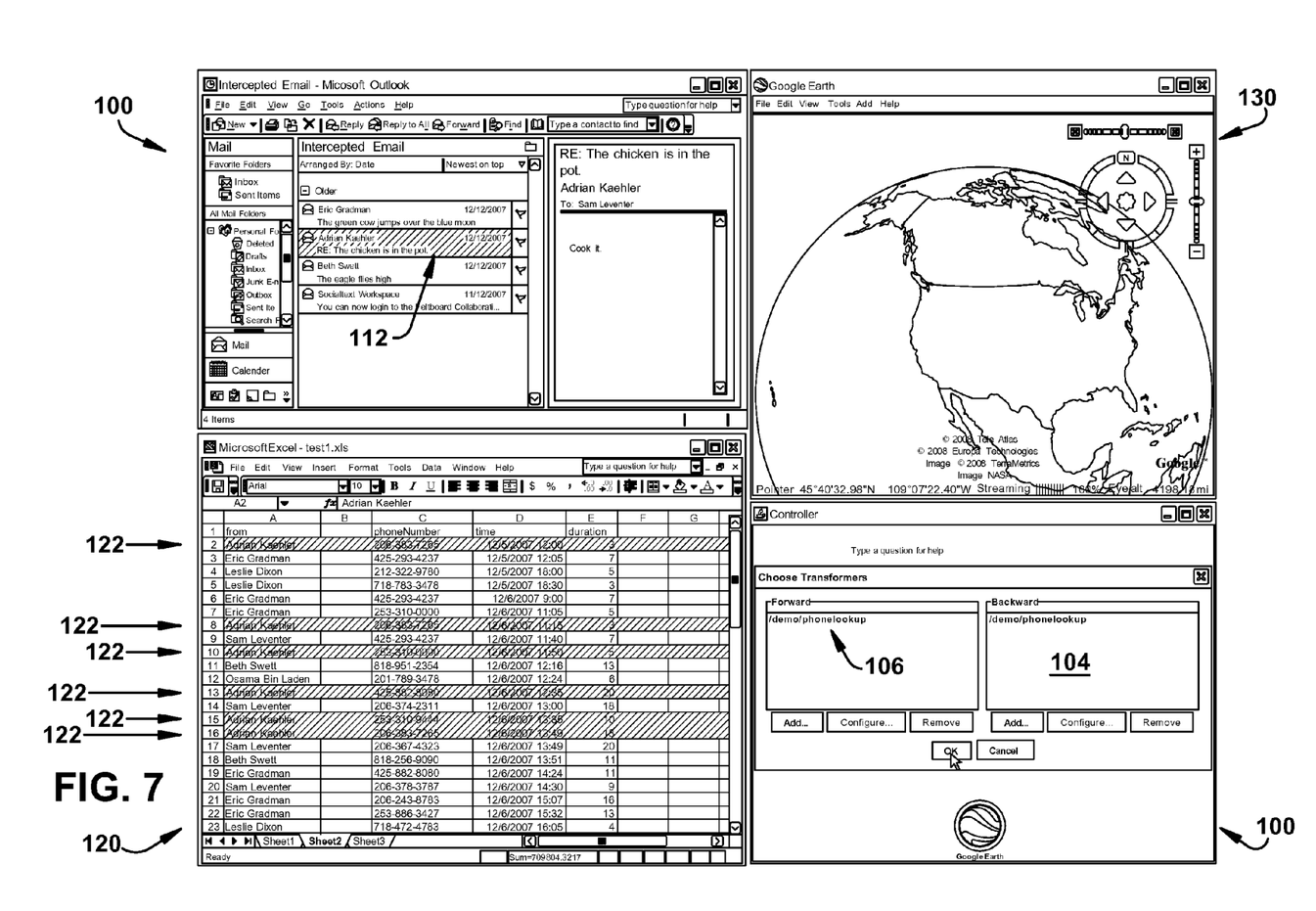
FIG. 7 illustrates a selection of a transformer in the GUI controller workspace in accordance with an aspect of the invention.

FIG. 7 illustrates a selection of a transformer in the GUI controller workspace in accordance with an aspect of the invention. Another application can be selected to be linked to the linked group by a transformer. The transformer provides a relationship between data types that application programs previously did not understand. In FIG. 7, a user has selected to link the linked group of Microsoft® Outlook® and Microsoft® Excel® to Google® Earth employing a transformer selection window 104 and has selected the transformer "phone lookup" 106.

Figure 8:
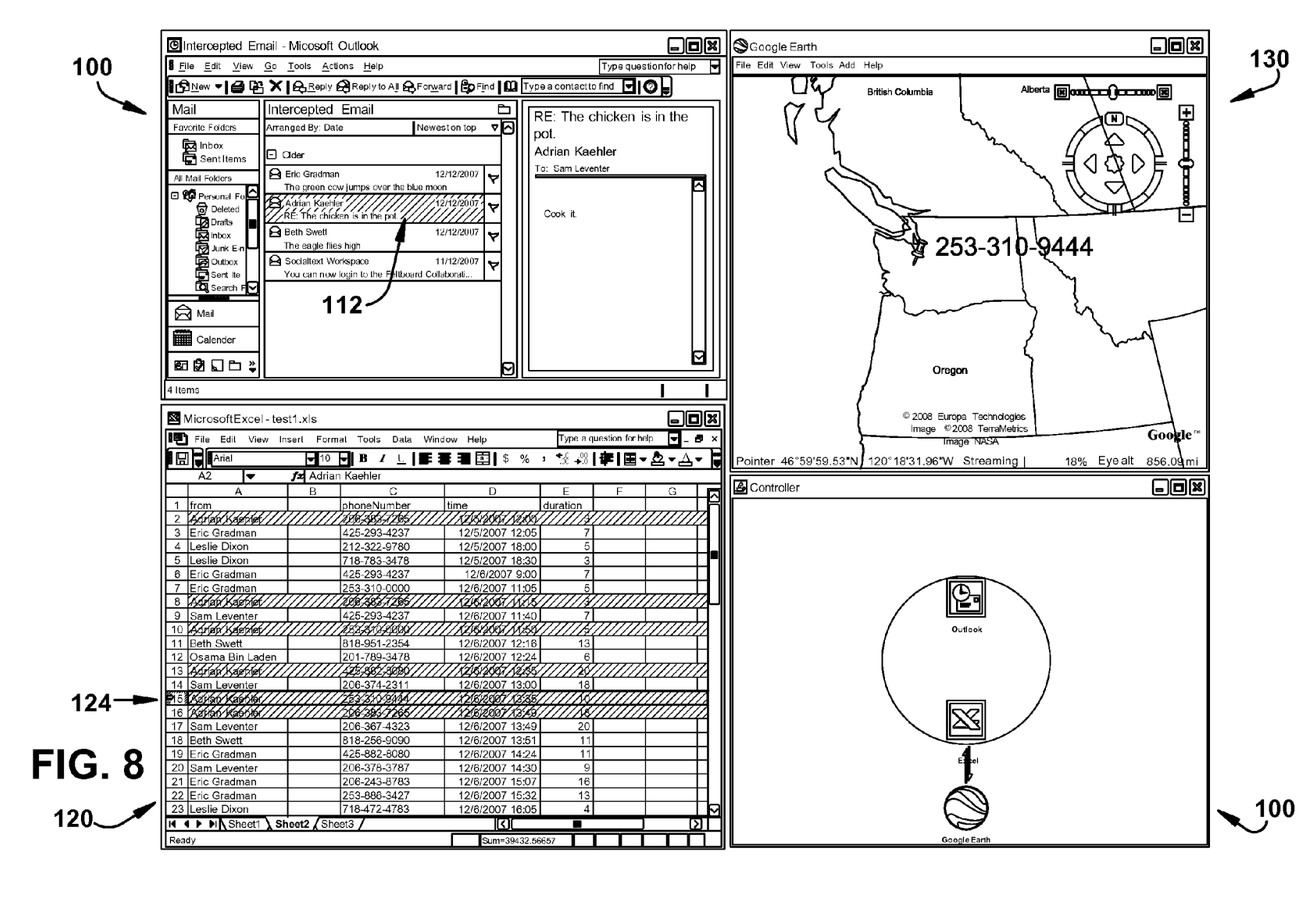
FIG. 8 illustrates the linking of the group Microsoft® Outlook® and Microsoft® Excel® to Google® Earth by the transformer via two double arrows outside the linking space in accordance with an aspect of the invention.

FIG. 8 illustrates the linking of the group Microsoft® Outlook® and Microsoft® Excel® to Google® Earth by the transformer via two double arrows outside the linking space. The "phone lookup" transformer 106 provides addresses associated with the phone number or person provided by the linked group to Google® Earth. As illustrated, in FIG. 8, a user has selected one of the phone numbers 124 associated with "Adrian Kaehler", which causes a message containing a respective phone number to be passed across the message backplane to the transformer "phone lookup" 106 which generates addresses associated with associated phone numbers. Google® Earth receives the address associated with the phone number and rotates the representation of Earth to the respective address location associated with the selected phone number. The transformer 106 can include an application relevant extractor that looks for matches of data elements in the messages transmitted from the message back plane to a phone number data type template that can look like the following:

```
map tid='phone number'>
    <scalar label='Phone Number?' called=" Phone Number '/>
</map>
```

Therefore, the application relevant data extractor will extract data elements in messages that contain a data element identifier "phone number" and look up the associated phone number and transmit it to a COTS adapter for Google® Earth which will convert the backplane message format to the Google® Earth message format and mapped to Google® Earth.

Figure 9:
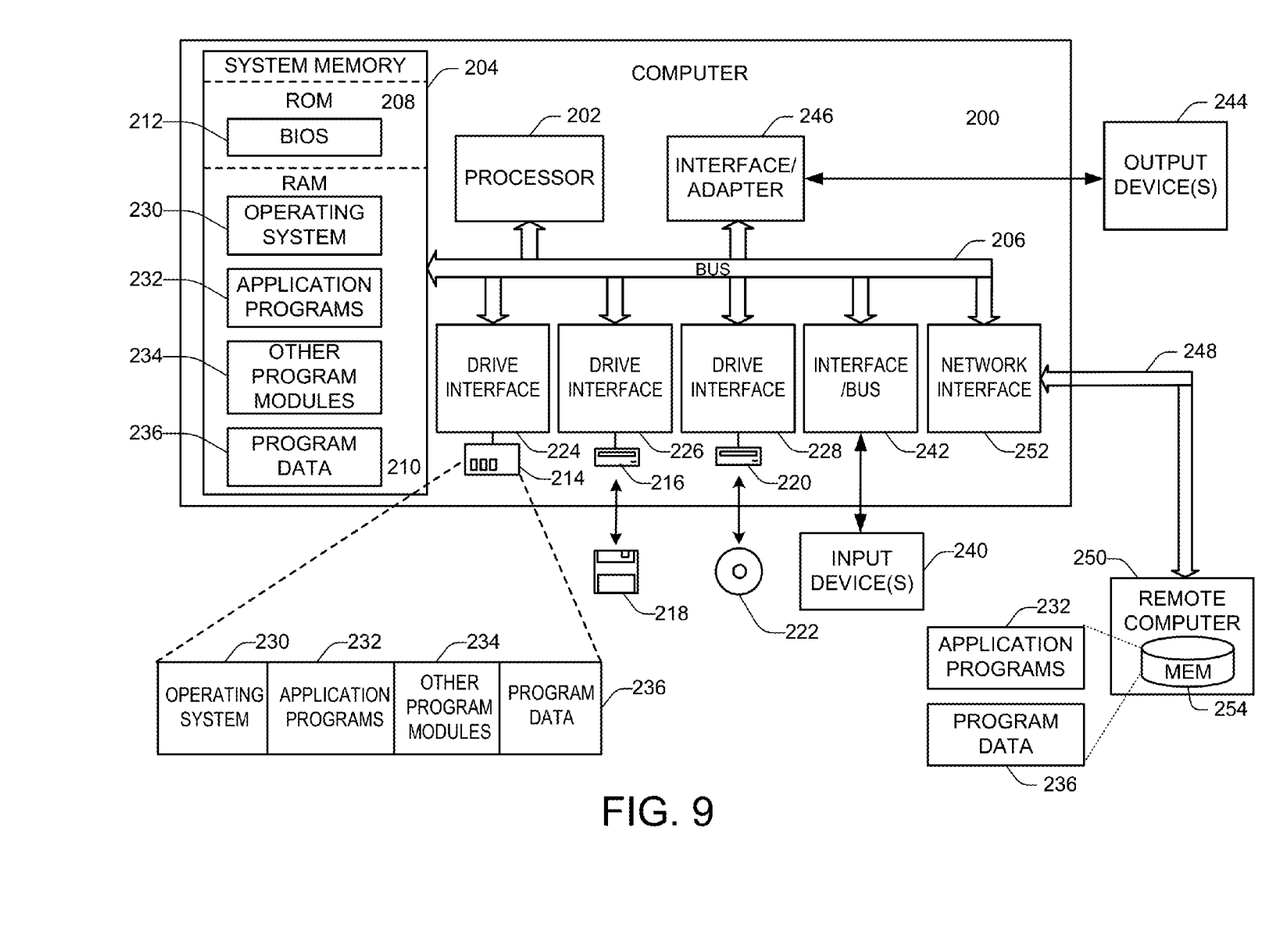
FIG. 9 illustrates a computer system that can be employed to implement systems and methods described herein, such as based on computer executable instructions running on the computer system.

FIG. 9 illustrates a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of the computer-aided engineering (CAE) tool running computer executable instructions to perform a method as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 228, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 210, including an operating system 230, one or more application programs 232, other program modules 234, and program data 236, such as the systems and methods for extracting application relevant data from messages as described in FIGS. 1-8.

A user may enter commands and information into the computer system 200 through user input device 240, such as a keyboard, a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 206 by other interfaces, such as a parallel port, a serial port or a universal serial bus (USB). One or more output device(s) 244, such as a visual display device or printer, can also be connected to the system bus 206 via an interface or adapter 246.

The computer system 200 may operate in a networked environment using logical connections 248 to one or more remote computers 250. The remote computer 250 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

Having described the invention, the following is claimed:

1. A system for extracting application relevant data from messages, the system comprising:
   a memory for storing computer executable instructions; and
   a processor for accessing the memory and executing the computer executable instructions, the computer executable instructions comprising:
      a first application relevant data extractor associated with a first software application;
      a second application relevant data extractor associated with a second software application, each of the first and second application relevant extractors comprising:
         a message parser that parses messages and builds a message tree having one or more objects;
         one or more data type templates that define a given data type based on one or more data elements; and
         a comparison engine that matches data elements in the one or more objects with data elements in the one or more data type templates, groups data elements in the one or more objects that matches data elements in the one or more data templates as a specific data type corresponding to the associated data type template that is matched, wherein the one or more data elements matched in a given data type template of the one or more data type templates comprises a proper subset of data elements in a given object of the one or more objects and the one or more data elements matched in the given data type template of the one or more data type templates comprises a proper subset of the one or more data elements in the given data type template; and
      a message backplane that routes a given set of messages with data elements matched in the one or more objects with data elements stored in the one or more data type templates that are transmitted and received between a back end and a front end of the first software application to the second application relevant data extractor in response to determining that the given set of messages contain data employable by the second software application to derive data not included in the given set of messages, routes messages that are transmitted and received between a front end and a back end of the second software application to the first application relevant data extractor;

wherein the front end of the first software application and the front end of the second software application each includes a graphical user interface for receiving user input and providing user output, and the back end of the first software application and the back end of the second software application each includes an execution engine for processing data and providing responses for events occurring at a corresponding front end.

2. The system of claim 1, wherein the comparison engine further maps the specific data type that is matched to the associated data type template to an object in a software application.

3. The system of claim 1, wherein the grouped data elements comprise the data element identifiers and associated attributes and/or values.

4. The system of claim 1, wherein the first application relevant data extractor extracts application relevant data that is mapped to the first software application from messages generated from the second software application and the second application relevant data extractor extracts application relevant data that is mapped to the second software application from messages generated from the first software application.

5. The system of claim 1, wherein the first application relevant data extractor maps application relevant data to the back end of the first application to cause the back end of the first application to generate instructions to the front end of the first software application to cause events to occur in the front end of the first software application based on the received application relevant data and the second application relevant data extractor maps application relevant data to the back end of the second application to cause the back end of the second application to generate instructions to the front end of the second software application to cause events to occur in the front end of the second software application based on the received application relevant data.

6. The system of claim 5, wherein the first application relevant data extractor is associated with a first message adapter configured to convert commercial off the shelf (COTS) application messages from a first COTS application message format to a message backplane message format and a message backplane message format to the first COTS application message format and the second application relevant data extractor is associated with a second message adapter configured to convert COTS application messages from a second COTS application message format to a message backplane message format and a message backplane message format to the second COTS application message format.

7. The system of claim 4, wherein the computer executable instructions further comprise a message backplane transformer configured to link data types of a first data type understandable by the first software application to data types of a second data type understandable by the second software application wherein the transformer comprises a third application relevant data extractor configured to extract and map data elements of the first data type to the transformer and further comprising a fourth application relevant data extractor configured to extract and map data elements of the second data type to the transformer.

8. The system of claim 7, further comprising a database accessible by the transformer that contains a third data type that links data of the first data type to data of the second data type.

9. The system of claim 4, further comprising a standard data type template stored in the memory that is employed by the first and second application relevant data extractors to provide the first and second software applications with common definitions between data types.

10. A non-transitory computer readable medium having computer executable components for linking software applications and extracting application relevant data from messages between software applications, the computer readable medium comprising:

a first application relevant data extractor associated with a first software application, the first application relevant data extractor comprising:

a first plurality of data type templates that each define a given data type based on one or more data elements relevant to the first software application; and a first comparison engine that matches data elements in messages provided to the first software application with data elements in one or more of the first plurality of data type templates, groups data elements from the messages that matches data elements in the one or more of the first plurality of data templates as specific data types corresponding to the associated data type templates that are matched and maps the specific data types that are matched to the associated data type template to objects in the first software application, wherein the one or more data elements matched in a given data type template of the first plurality of data type templates comprises a proper subset of data elements in a given object of the objects in the first software application and the one or more data elements matched in the given data type template of the first plurality of data type templates comprises a proper subset of the one or more data elements in the given data type template of the first plurality of data type templates; and a second application relevant data extractor associated with a second software application, the second application relevant data extractor comprising:

a second plurality of data type templates that each define a given data type based on one or more data elements relevant to the second software application;

a second comparison engine that matches data elements in messages provided to the second software application with data elements in one or more of the second plurality of data type templates, groups data elements from the messages that matches data elements in the one or more of the second plurality of data templates as specific data types corresponding to the associated data type templates that are matched and maps the specific data types that are matched to the associated data type template to objects in the second software application; and a message backplane that routes a given set of messages with data elements matched in the one or more objects with data elements stored in the one or more data type templates that are transmitted and received between a front end and a back end of the first software application to the second application relevant data extractor in response to determining that the given set of messages contain data employable by the second software application to derive data not included in the given set of messages, and routes messages that are transmitted and received between a front end and a back end of the second software application to the first application relevant data extractors;

wherein the front end of the first software application and the front end of the second software application each includes a graphical user interface for receiving user input and providing user output, and the back end of the first software application and the back end of the second software application each includes an execution engine for processing data and providing responses for events occurring at a corresponding front end.

11. The non-transitory computer readable medium of claim 10, wherein the first application relevant data extractor maps application relevant data to the back end of the first application to cause the back end of the first application to generate instructions to the front end of the first software application to cause events to occur in the front end of the first software application based on the received application relevant data and the second application relevant data extractor maps application relevant data to the back end of the second application to cause the back end of the second application to generate instructions to the front end of the second software application to cause events to occur in the front end of the second software application based on the received application relevant data.

12. The non-transitory computer readable medium of claim 10, wherein the first application relevant data extractor is associated with a first message adapter configured to convert commercial off the shelf (COTS) application messages from a first COTS application message format to a message backplane message format and a message backplane message format to the first COTS application message format and the second application relevant data extractor is associated with a second message adapter configured to convert COTS application messages from a second COTS application message format to a message backplane message format and a message backplane message format to the second COTS application message format.

13. The non-transitory computer readable medium of claim 10, further comprising a message backplane transformer configured to link data types of a first data type understandable by the first software application to data types of a second data type understandable by the second software application wherein the transformer comprises a third application relevant data extractor configured to extract and map data elements of the first data type to the transformer and further comprising a fourth application relevant data extractor configured to extract and map data elements of the second data type to the transformer.

14. The non-transitory computer readable medium of claim 13, further comprising a database accessible by the transformer that contains a third data type that links data of the first data type to data of the second data type.

15. The non-transitory computer readable medium of claim 10, further comprising a standard data type template that is employed by the first and second application relevant data extractors to provide the first and second software applications with common definitions between data types.

16. A method for extracting application relevant data from messages, the method comprising:
routing a message that-is transmitted and received between a front end and a back end of a first software application to a data extractor associated with a second software application in response to determining that the message contains data employable by the second software application to derive data not included in the message;

parsing the message received from the first software application and building a message tree of the parsed message having one or more objects;

comparing data elements in the one or more objects with data elements in one or more data type templates, the data type templates defining a given data type based on one or more data elements, to determine matches between data elements in the one or more objects to data elements in the one or more data templates, wherein the one or more data elements matched in a given data type template of the one or more data type templates comprises a proper subset of data elements in a given object of the one or more objects and the one or more data elements matched in the given data type template of the one or more data type templates comprises a proper subset of the one or more data elements in the given data type template; and mapping the data elements in the one or more objects that match data elements in the one or more data templates into the second software application;

wherein the front end of the first software application includes a graphical user interface for receiving user input and providing user output, and the back end of the first software application includes an execution engine for processing data and providing response for events occurring at a corresponding front end.

17. The method of claim 16, further comparing data elements in the one or more objects with data elements in a standard data type template file that provides a plurality of applications with common definitions between data types.

18. The method of claim 16, further comprising:
routing a second message that has been transmitted between a front end and a back end of the second software application to a data extractor associated with the first software application;

parsing the second message received from the second software application and building a message tree of the parsed second message having one or more objects;

comparing data elements in the one or more objects of the second message with data elements in one or more second data type templates, the second data type templates defining a given data type based on one or more data elements, to determine matches between data elements in the one or more objects of the second object to data elements in the one or more second data templates; and mapping the data elements in the one or more objects of the second message that match data elements in the one or more second data templates into the first software application.

19. The system of claim 1, wherein the given object in the one or more objects comprises a person object, wherein the one or more data elements of the person object comprises:
a name of a person; and
a phone number associated with the person; and
wherein the data elements of the given data type template of the one or more data type templates comprises a phone number template comprising a data element for the phone number associated with the person.

20. The system of claim 19, wherein the person object excludes an address associated with the person and the phone number template excludes the name of the person, wherein the relevant data extractor of the second application is configured to:

receive the phone number template populated with the phone number of the person; and route the phone number template to the back end of the second software application; and wherein the back end of the second software application is configured to:

determine an address associated with the phone number for the person based on the phone number template; and transmit the determined address associated with the phone number to a front end of the second application.

\* \* \* \* \*

UNITED STATES PATENT AND TRADEMARK OFFICE
CERTIFICATE OF CORRECTION

PATENT NO. : 9,946,584 B2
APPLICATION NO. : 12/241775
DATED : April 17, 2018
INVENTOR(S) : Adrian Kaehler et al.

It is certified that error appears in the above-identified patent and that said Letters Patent is hereby corrected as shown below:

In the Specification

Column 15, Line 6 reads "extractors" should read --extractor--

Signed and Sealed this
Twenty-ninth Day of May, 2018

Andrei Iancu
*Director of the United States Patent and Trademark Office*